Patented Nov. 15, 1938

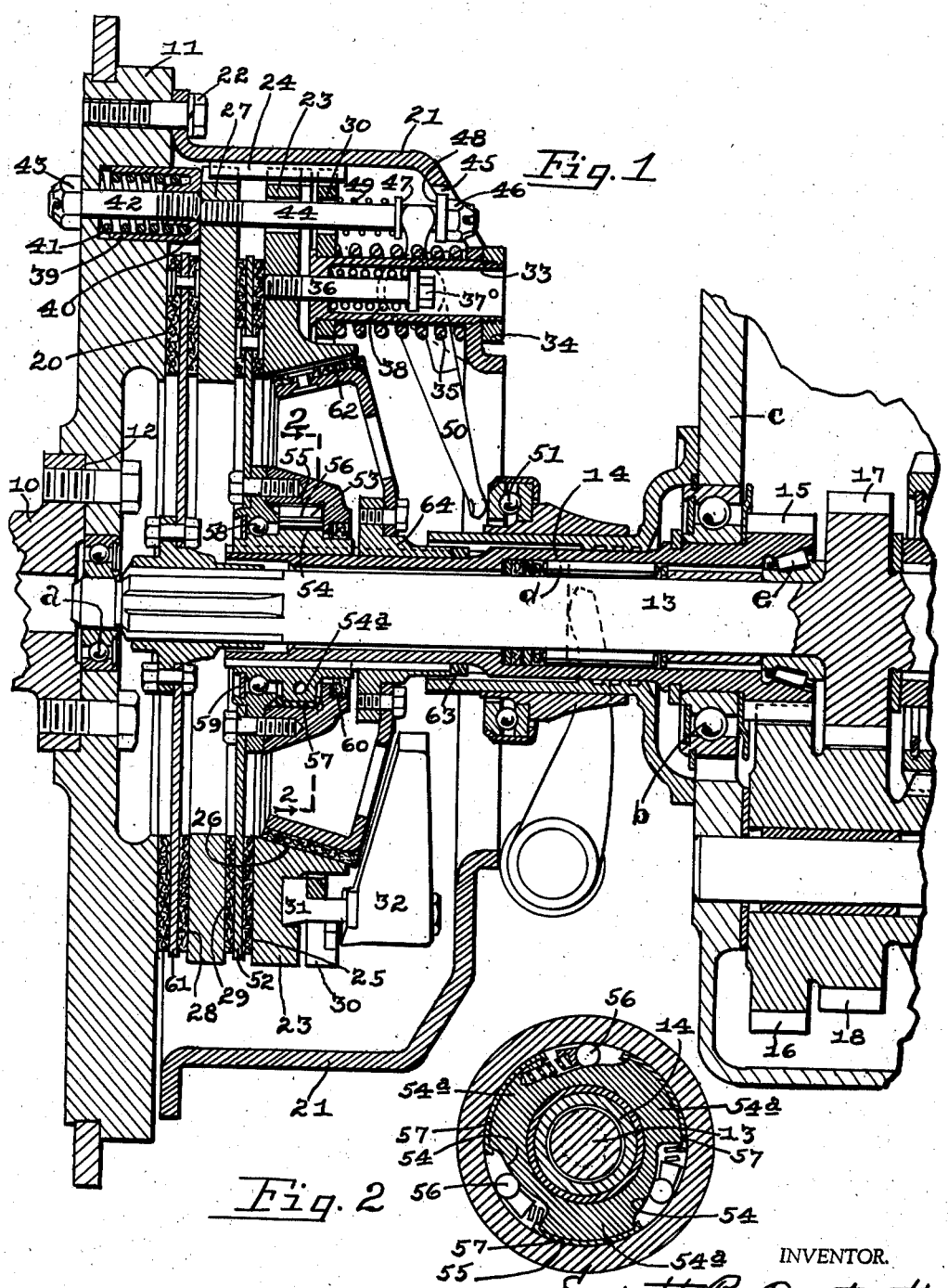

2,136,811

UNITED STATES PATENT OFFICE 2,136,811

MULTICLUTCH MECHANISM

Everett R. Burtnett, Los Angeles, Calif., assignor to Automotive Improvement Patents Corporation, Los Angeles, Calif.

Application August 11, 1936, Serial No. 95,358

13 Claims. (Cl. 192—48)

This invention relates to multi-clutch mechanisms, and more particularly to multi-clutch mechanism for changing speeds and character of drive in motor vehicle change speed transmissions.

The present invention is adapted for use in connection with multi-speed transmitting units having a plurality of concentric power transmitting members each for separate drive coupling to a common cooperating axially aligned power transmitting member, such as several relatively rotatable and concentric clutch shafts, geared to each other to effect different speed ratios of drive to or in a multi-speed gearset unit, and for individual connection to turn with the vehicle engine driven driving member.

An advantageous juncture in a motor vehicle drive to control change of driving speed ratios is between the "driving member" (usually constituted of the revolvable mass crankshaft and flywheel) and the clutch shaft (input element to the multi-speed gearset. Multi-friction clutch mechanism may be used at this point in the drive to obtain different speed ratios if a plurality of clutch or input shafts are provided, each connecting with a separate and different speed ratio effective transmitting train of the gearset and each for separate connection to the driving member by the multi-friction clutch mechanism. An advantage of locating friction clutch means in the input trains to the multi-speed gearset for controlling speed changes in motor vehicle transmissions is that the clutches so disposed are not required to transmit torque after being multiplied by a speed reduction gear and therefore do not offer the problems of size, weight, complication of design and cost of manufacture as encountered if arranged beyond the gear drives of the change speed transmitting mechanism.

Another advantage in locating change speed controlling multi-clutch mechanism of the friction type at the engine flywheel drive, relatively before the change speed gearset, is because of the comparatively large diameters, if such are to be of the simple single disk form, least expensive to manufacture and most rugged to the ends of meeting hard service with reliability. In such location in motor vehicles this large diameter comes either under or well ahead of the toe board of the front passenger compartment and therefore does not incur abnormal floor projections.

However, in connection with speed changing multi-friction clutch mechanisms for location at the engine flywheel, or elsewhere as far as that is concerned, if the next-in-ratio drive is to be automatically accomplished at the multi-clutch change speed provision without ceasing of torque in propulsion of the vehicle, the multi-clutch must act accumulatively. That is, the unit of frictionally-engaging elements, for bringing the next-in-ratio drive into play supplementively over the relatively lower ratio which carries the load to this point, must be engaged successively to engagement of the unit of frictionally-engaging elements already engageably in effect establishing the load carrying under-ratio drive, and usually by movement in the same direction of means common to the plurality of separate drive connecting units of frictionally-engaging elements making up the multi-clutch speed changing mechanism.

It follows therefore, that if the succeeding drive is to be accumulatively established, that some means must be provided or interposed in series in the relatively under-gear ratio drive to be supplanted, permitting rotation of the high speed clutch at a higher speed in connection with a higher speed ratio drive accumulatively brought into connection with the common driving member, while the train of the supplanted under-gear-ratio drive remains mobilized to take the pull of the common driving member upon relinquishment of the relatively higher speed ratio of drive.

It follows further therefore, that if such a means, usually termed an overrunning clutch, is provided and arranged in series in the under-gear-ratio drive which is to be accumulatively supplanted, as described to meet the aforementioned requirements, this under-gear-drive will be capable of one-way drive only, precluding the engine compression being utilized as a brake against vehicle momentum in the under-gear-ratio. This inability to drive the engine by the vehicle momentum in the under-gear-ratio in multi-clutch mechanisms of the type referred to has deterred their adoption and prevented their advantages being enjoyed by motorists. This lack of utility requires some means optionally operable to cause retraction of the multi-clutch mechanism from, or to prevent same from reaching, a state of accumulative engagement effective to bring the high speed clutch shaft into play, and at the same time convert the normally one-way drive under gear drive train into a positive (two-way) driving train.

Accordingly, the present invention contemplates, first, the provision of a friction-clutch for optionally circumventing the one-way drive clutch of the under-gear-ratio, which optional friction-clutch will be clash proof and fool proof with respect to its operation; contemplates secondly, improvements in multi-clutch forms, combination and arrangements to render the multi-clutch unit optionally retractable into clutching relation exclusively with the under-gear-ratio, and therein (under the optional control) to utilize the optional friction-clutch; and contemplates thirdly, novel combination of two-stage engaging speed responsive automatic multi-clutch mechanism and spring type clutch retractive means and alternately engageable clutch means, all whereby a normally one-way drive effective first speed ratio is first automatically connected and followed by a second speed ratio automatically connected. Which second speed ratio connecting automatic clutch engagement may be optionally cancelled while leaving the first speed ratio connection in effect. And which normally one-way drive effective first speed ratio automatic clutch effected driving connection may be altered to be two-way drive effective by the engagement of the optionally engageable clutch unit as an alternate to the optional cancelling of the automatically connected second speed ratio.

Other objects of the present invention will be apparent with progression through the annexed specification accompaniment hereto.

In the drawing:

Figure 1 shows, in vertical longitudinal section, a portion of a change speed transmission and a multi-clutch mechanism constructed in accordance with the present invention.

Figure 2 is a vertical transverse sectional view taken on line 2—2 of Fig. 1, illustrating the one-way driving direction of the one-way clutch component of the under-gear ratio.

Referring to the drawing, I show an engine crankshaft 10 and the usual rotatively connected flywheel 11, together constituting a driving member 12. In axial alignment with the driving member 12 are two concentrically arranged clutch shafts 13 and 14 which are adapted for individual connection to turn with the driving member 12. These two clutch shafts or transmitting members 13 and 14 are relatively rotatable and connected by means of gears 15, 16, 17 and 18 each to drive the other at a different speed and in either direction. With respect to mounting detail, the inner of these shafts 13 is pilot mounted in the usual manner by a bearing *a* the latter received in the recessed end of crankshaft 10; while the outer sleeve-shaped shaft 14 is journalled by means of the usual main transmission bearing *b* the latter supported in the gearbox wall *c*; and the inner shaft 13 is journalled at its power outputting end within the outer shaft 14 preferably by means of a straight roller bearing *d* and a tapered roller bearing *e*. These designated members, aside from their supporting designated devices, constitute one form of change speed transmission unit with which the present multi-clutch mechanism will cooperate advantageously.

Speed responsive means are provided for the automatic coupling of first the outer shaft 14 to be driven by the driving member 12 and thereafter the coupling of the inner shaft 13 to be driven by the driving member 12, respectively, upon relatively stepped different speeds of rotation of the driving member 12. I show a practical way of constructing the multi-clutch mechanism of the present invention, comprising the usual bottom friction flat clutch face 20 formed on the flywheel 11. The usual clutch shell 21 is fixedly secured preferably by capscrews 22 to the flywheel 11. A presser driving clutch member 23 is carried in rotation with, but longitudinally movable relative to, the shell 21 preferably by means of bars 24 integral with the shell 21. The presser member 23 has a forwardly disposed flat friction clutch face 25 and a rearwardly disposed cone-shaped friction face 26. An intermediate driving clutch member 27 is also carried in rotation with, but longitudinally movable relative to, the shell 21 by the means 24, which intermediate driving clutch member 27 has its opposite sides flat to provide friction clutch faces 28 and 29.

Immediately rearward of the presser driving clutch member 23 is a longitudinally movable member 30 also carried in rotation with the shell 21 by means of the bars 24. This member 30 operates as a yielding plate between which and the presser driving clutch member 23 are operatively pivoted the automatic clutch actuating feet 31 of a series of centrifugal weights 32.

As a means limiting the movement of this retractive plate 30 forwardly, a series of hollow bolts 33 are provided with their heads seating on the forward side of the retractive plate 30 and their ends projecting through the rearward back wall portion of the shell 21, at which point adjusting nuts 34 threaded on the bolts 33 control the maximum forward position of the retractive plate 30 but allow for retraction of the latter rearwardly.

To yieldingly urge the retractive plate 30 to normally occupy its most forwardly permitted position, a series of main clutch compression springs 35 are provided and preferably mounted over the hollow bolts 33, the latter acting as guides for these springs. Thus the retractive plate 30 is provided with a high tension against it moving backward due to any pressing influence from the front.

As a preferable means for yieldingly holding the presser driving clutch member 23 at all times under tension to move rearwardly toward the retractive plate 30, whereby the feet 31 of the centrifugal weights 32 are rendered the exclusive factor tending to spread the presser and retractive members 23 and 30 apart, a series of long capscrews 36 are threaded into apertures in the presser driving clutch member 23 and extend rearwardly freely through the head end of the hollow bolts 33 and with their heads 37 disposed at a point accommodating a compression spring 38 being telescoped thereover between the head 37 of the respective spring encircling capscrew 36 and the bore bottom of the hollow bolts 33.

As a preferable means for yieldingly holding the intermediate driving clutch member 27 at a normal distance rearwardly from the clutch face 20 of the flywheel 11, the latter is bored out at 39 to receive spring cups or plungers 40, the latter to rest against the intermediate driving clutch member 27, with a compression spring 41 arranged within the cup 40 and tending to thrust same against the intermediate clutch member 27, and a bolt 42 threaded into an aperture in the closed end of the cup 40 and extending freely through the forward side of the flywheel at which point a nut 43 threaded on the bolt 42 adjusts the maximum rearwardly allowed movement of the cup 40 under the urge of the spring 41.

As a means to optionally pull the intermediate driving clutch member 27 rearwardly relatively away from the face 20 of the flywheel 11, several long bolts 44 at equally spaced circumferential points are threaded into apertures in the intermediate driving clutch member 27, extend rearwardly freely through both the presser member 23 and the retractive plate 30 and to a point substantially coincident with the cross sectional wall of the shell 21, in which latter operating holes 45 are provided for the bolts 44. On the ends of these bolts 44 are provided adjusting nuts 46 and washers 47 and 48, the former for compressing a low tension anti-rattler spring 49 and the latter for transmitting thrust rearwardly to the nut 46. The usual clutch throw-out levers 50 are mounted for rocking movement upon the shell 21. The actuating ends of these levers 50 engage the washers 48 and the actuatable ends of the levers 50 extend clutch-axisward for engagement from the rear by the usual throw-out bearing 51, the latter for actuation by the operator, or by some power media means under control of the operator.

For the low speed ratio of drive outer shaft 14 is first coupled to the driving member 12 automatically in response to increasing speed of rotation of the latter. A driven clutch disk 52 is disposed between the flat clutch face 25 of the presser driving clutch member 23 and the intermediate driving clutch member 27, and is clutchable therebetween upon the centrifugal weights 32 tilting under increasing speed of rotation of the driving member 12 and consequently pressing the presser clutch member 23 forwardly. The springs 41 initially resist movement forwardly on the part of the intermediate clutch member 27. Hence the disk 52 is gradually clutched up to a positive state under the centrifugal weight force increasing with increasing revolutions of the driving member 12.

For transmitting the drive of the disk 52 to its carrying outer shaft 14, a one-way clutch 53 is provided on the shaft 14. This one-way drive or overrunning clutch 53 preferably comprises a cam 54 to turn with the shaft 14, an annulus 55 to turn with the driven clutch disk 52 and roller clutch members 56 engaging the driving annulus 55 and the driven cam 54. By this means the inner and higher speed shaft 13 may be coupled to turn with the driving member 12, while the driven clutch disk 52 connected to the outer shaft 14 through the overrunning clutch 53 remains coupled to turn with the same driving member 12, or usually termed accumulative multi-clutch engagement. Supporting the driven clutch disk 52 for true rotation around its axis while the overrunning clutch 53 is free, are preferably bronze bearing shields or caps 57 installed on the radially projecting portions 54ª of the cam 54 which project intermediately therebetween, and preferably a ball bearing 58, both bearing elements being grease packed by means at the front consisting of the usual ball bearing shield 59 and at the rear by a packing 60.

A second driven clutch disk 61 is provided, carried in rotation with the inner shaft 13 and disposed clutchably between the clutch face 20 on the flywheel 11 and the intermediate driving clutch member 27. Accumulative engagement of this higher speed ratio driven clutch disk 61 to turn with the driving member 12 along with the lower speed ratio driven clutch disk 52 takes place upon the driving member 12 attaining a speed sufficient to actuate the centrifugal weights 32 sufficiently to overcome the secondary resistance of the springs 41 through the medium of the clutched low speed disk 52 and intermediate driving clutch member 27, which latter up to this point serves exclusively as a bottom friction member to the low speed clutch disk 52.

Optional retraction of the clutch mechanism to exclusively clutch the low speed ratio driven clutch disk 52 is brought about by thrusting the throw-out bearing 51 forwardly, in turn actuating the levers 50 and in turn pulling the intermediate driving clutch member 27 rearwardly out of its engaging proximity with the high speed ratio driven clutch disk 61. This optional movement of the intermediate driving clutch member 27 is yielded to by the main compression springs 35. The optional actuation forces the presser and retractive plates 23 and 30 in unity rearward through the medium of the low speed driven disk 52.

To render the automatic speed changing multi-clutch mechanism at least partially disengageable and to optionally bring the subject under-gear drive into play and to cause the latter to be effective as a two-way drive low speed ratio in which the engine may be driven by the vehicle momentum as well as the vehicle driven from the engine, I provide an auxiliary driven clutch cone 62 in positive connection to turn with the low speed ratio shaft 14 and to be optionally-engaged by the mating cone face 26 on the internal rim of the main presser driving clutch member 23. A snap ring 63 is fitted in a corresponding circumferential groove cut in the periphery of the shaft 14 and against which snap ring 63 the hub 64 of the clutch cone 62 spends its end thrust as given to it under engagement from the mating presser cone 26. This end thrust load is passed on through the shaft 14 into the main transmission shaft bearing b.

It will be seen that the cone clutch 62 and 26 circumvents the normal one-way or overrunning clutch connection 53 between the same driving clutch members and the driven shaft 14. It will be seen further, in this connection, that optional retracting of the intermediate driving clutch member 27, sufficiently to push the driven clutch disk 52 and the main presser driving clutch member 23 rearwardly, into a position thrusting the driving clutch cone face 26 of the main presser member 23 into engagement with the driven clutch cone 62, will frictionally establish the driving clutch member 23 in two-way drive couple with the low speed ratio shaft 14.

Thus I have described in detail a simple, rugged and inexpensive multi-speed transmission, having a one-way drive low speed ratio, with a stepped speed of rotation accumulative-engaging type of speed responsive automatic multi-clutch mechanism for successively connecting different of the multi-speeds, and a novel means including an optionally engageable friction clutch for optionally causing the automatic multi-clutch to be rendered ineffective in its drive connecting capacity over a high speed ratio of the multi-speed transmission and with resultant concentration of drive through the low speed ratio and the subsequent conversion of the latter from a normally one-way drive (as automatically established) to a two-way drive capacity.

It will be understood that various changes may be made in forms and arrangements and details as shown without departing from the spirit of the invention as set forth in the appended claims.

I claim:
1. In combination, a plurality of concentric and relatively rotatable power transmitting members one for low speed ratio and another for high speed ratio of drive, a common drive member in axial alignment with said plurality of concentric members, and speed responsive automatic clutch mechanism responsive to the speed of said drive member for accumulatively coupling first one and then the other of said plurality of concentric members to be directly driven from said drive member, the low speed clutch unit of said clutch mechanism provided with an overrunning clutch whereby the high speed clutch unit of said clutch mechanism may be accumulatively engaged while the low speed connection remains mobilized to take the load, and means under control of the operator for optionally preventing engagement of the high speed unit of said clutch mechanism or for retracting same from engagement once engaged and for subsequently effecting a positive two-way drive between the low speed concentric member and said drive member, said optional two-way drive means including a pair of frictionally-engaging elements normally disengaged but engageable to circumvent the said overrunning clutch with a positive drive.

2. In a power transmission, a first power transmitting member, at least two relatively rotatable concentric power transmitting members each adapted for connection to said first power transmitting member, an overrunning device to drive one of said concentric power transmitting members, a first clutch unit for connecting said first power transmitting member to drive said overrunning device, means for engaging and disengaging said first clutch unit, a second clutch unit for connecting the other of said concentric power transmitting members and said first power transmitting member, means for engaging and disengaging said second clutch unit, a third clutch unit for supplementing the one-way driving connection as afforded by said overrunning device with a two-way driving connection therebetween while said first clutch unit is retained in engagement, and means for optionally causing disengagement, or preventing engagement of, said second clutch unit and for substantially simultaneously causing engagement of said third clutch unit and sustaining of engagement of said first clutch unit.

3. In a power transmission, driving and driven members, one of said driving and driven members comprising a plurality of torque transmitting members, a speed responsive automatic clutch mechanism responsive to the speed of one of said driving and driven members for first causing a drive connection of one and later a drive connection of another of said plurality of members with the other of said driving and driven members, automatic means for disengaging said clutch mechanism from both drive connecting engagements, separate means for optionally partially retracting said speed responsive automatic clutch mechanism so as to disestablish or prevent its secondary drive connection effecting engagement, an overrunning clutch in series in the said first established drive connection of said speed responsive automatic clutch mechanism for rendering the said first drive connection a one-way drive, an auxiliary two-way drive effective clutch unit engageable to connect the same connectable members as served by said overrunning clutch and said first established drive connection of said speed responsive automatic multi-clutch mechanism, and means whereby said optional partial retracting of said speed responsive automatic multi-clutch mechanism causes engagement of said two-way drive effective auxiliary clutch unit.

4. In combination with one power transmitting member and a plurality of other power transmitting members in axial alignment with the said first member; of means for individually connecting the respective members of the said plurality of members to the said one member comprising, means including a first plurality of frictionally-engaging elements for connecting one of the said plurality of members and said one member such that rotation will be transmitted at least in one direction between one and the other of said members, means including a second plurality of frictionally-engaging elements for connecting another one of the said plurality of members and said one member such that rotation will be transmitted at least in one direction between one and the other of said members, means for engaging and disengaging each of the said pluralities of frictionally-engaging elements, and means including an auxiliary clutch mechanism normally disengaged but for optional engagement forming means for supplementing the connecting effect of one of the aforesaid means between one of the said plurality of power transmitting members and the said one power transmitting member whereby a more positive connection may be effected between the respective connectable pair of said members.

5. In a clutch mechanism, in combination; axially aligned driving and driven power transmitting members one of which said driving and driven members comprising a single member and the other of which said driving and driven members comprising a plurality of members; means including a two-stage engaging speed responsive automatic clutch mechanism responsive to different predetermined speed of rotation attainments of one of the said driving and driven members forming means whereby one of the said plurality of driving or driven members is initially operatively connected with the said single one being the other of the said driving and driven members upon attainment of the first of the said different predetermined speed of rotation attainments and whereby another of the said plurality of driving and driven members is operatively connected with the said single one being the other of the said driving and driven members upon attainment of the second of the said different predetermined speed of rotation attainments; and means including another clutch mechanism forming an auxiliary clutch to said speed responsive automatic clutch mechanism and forming means for supplementing the said speed responsive automatic clutch means operating connection between at least one pair of the said driving and driven members with a secondary and wholly supplementary operating connection therebetween.

6. In a power transmitting mechanism which includes one power transmitting member and a plurality of other power transmitting members the latter forming an axially aligned transmitting means plurality of members, respectively, for individual direct drive operating connection with the said one member; means including a first pair of engageable members forming means for effecting said connection between one of the said plurality of members and the said one member; means including a second pair of engageable members forming means for effecting said connection between another of the said plurality of members and the said one member; means for causing engagement and disengagement of each of the respective connection effecting pairs of the said engageable members; means including another pair of engageable members provided with means for optionally engaging and disengaging same forming means for supplementing at least one of the said respective connection-effecting pairs of the said engageable members between their respective connectable pair of said power transmitting members such that a second direct drive operating connection effective instrument may be brought into play between a given respective operatively connectable pair of the said power transmitting members.

7. In a clutch mechanism, a plurality of individually direct drive connectable pairs of power transmitting members, first distinct driving and driven pairs of disk-shaped engageable clutch elements of said clutch mechanism for individually causing said connection between each of the said individual connectable pairs of said plurality of power transmitting members, means for causing engagement and disengagement of each of the distinct individual-connection-causing said first pairs of disk-shaped driving and driven clutch elements, means including an overrunning clutch device disposed such that same operates to complete the driving connection effect of at least one of the said distinct connection causing pairs of said first engageable clutch elements between their associate respective connectable pair of said power transmitting members whereby said connection is normally effective to transmit rotation in one direction only, and means including a pair of cone-shaped driving and driven engageable clutch elements with means for engaging and disengaging same forming means for supplementing the said normal one-way connection with a two-way effective connection between the respective connectable pair of the said power transmitting members.

8. The combination of one power transmitting member, a plurality of other power transmitting members in axial alignment with said one member, means including a system of frictionally engaging driving and driven clutch elements operatively divided into a plurality of distinct clutching units and provided with resilient retractive means for causing the disengagement of each of said clutching units under certain conditions and with automatic means for causing the engagement of each of the said clutching units under certain other conditions forming means for first operatively connecting one and later another of the said plurality of power transmitting members to the said one power transmitting member, and means including an overrunning clutch and an auxiliary pair of frictionally engaging clutch elements forming means for alternating the operating connection between at least one of the said plurality of power transmitting members and the said one power transmitting member such that said operating connection therebetween will either be one-way or two-way drive effective.

9. In a clutch mechanism, driving and driven power transmitting members, a bottom friction driving clutch element rotatable with the said driving member, a presser friction driving clutch element rotatable with the said driving member and clutch engagingly movable toward the said bottom friction clutch element, a driven clutch disk disposed clutchable between the said bottom and presser clutch elements and adapted as a first friction clutch element contributing to drive the said driven power transmitting member, an overrunning clutch forming means completing a driving connection between the said driven clutch disk and the said driven power transmitting member, a second frictionally engageable driven clutch element connected to rotate in either direction with the said driven power transmitting member, and means for clutch control actuating the said presser driving clutch element either toward the said bottom friction driving clutch element to effect the clutching of the said first friction clutch element comprising the said driven clutch disk or toward the said second frictionally-engageable driven clutch element to effect frictional-engagement of the latter and the said presser driving clutch element.

10. In a clutch mechanism, driving and driven power transmitting members one of which comprising a plurality of members, clutch means including three independently engageable frictionally-engaging pairs of driving and driven clutch elements each forming a distinct clutch unit between and for operatively connecting respective pairs of said driving and driven power transmitting members, a presser clutch element of each of said three independently engageable pairs of driving and driven frictionally-engaging clutch elements, means normally but yieldingly urging each presser clutch element to normally occupy a position such that the respective clutch unit of frictionally-engaging elements is disengaged, automatic means for operation under first certain conditions to overcome said yielding means sufficiently and to actuate the presser clutch element of a first of the said three distinct clutch units such that the frictionally-engageable elements thereof are brought into engagement, means whereby the said automatic means are rendered operative under secondary certain conditions to overcome said yielding means sufficiently and to actuate the presser clutch element of a second of the said three distinct clutch units such that the frictionally-engageable elements thereof are brought into engagement, and means whereby certain of the said presser clutch elements may be optionally retracted against the normal tendency of the said automatic means either such that one of the said first and second distinct clutch units of frictionally-engaging elements will be caused to disengage or such that said one clutch unit will be caused to disengage and the frictionally-engageable elements of the third of said three distinct clutch units caused to engage.

11. In a motor vehicle drive, in combination with the flywheel of the vehicle engine; of a plurality of clutch shafts; with a clutch mechanism between and for operatively connecting each of the plurality of clutch shafts to be individually direct drive driven from the said flywheel, said clutch mechanism comprising an independently engageable unit of clutch elements for causing said connection between said flywheel and each of said plurality of clutch shafts and resilient means coacting with certain of the said clutch elements such that all said clutch units are normally disengaged, automatic means coacting with said clutch elements and operative to counteract the said resilient means such that first one and thereafter another of the said independently engageable units of clutch elements will be brought into engagement, respectively, under certain progressively changing conditions; and means coacting with certain of the said clutch elements such that, and for control by the operator of said vehicle whereby, said operator may optionally cause either, one of the said independently engageable units of clutch elements to become or remain disengaged over the influence of the said automatic means while leaving the other of the said independently engageable units of clutch elements engaged under the influence of said automatic means, or more than one of the said independently engageable elements to become or remain disengaged over the influence of said automatic means.

12. The combination in a clutch mechanism, of axially aligned driving and driven power transmitting means elements one of which driving and driven elements comprising a plurality of members, means including a first friction clutch mechanism and an overrunning clutch mechanism contributing jointly to cause a one-way drive connection between one pair of said driving and driven transmitting elements, means including a second friction clutch mechanism to cause a drive connection between another pair of the said driving and driven transmitting elements, automatic but yielding means for normally causing disengagement of both said friction clutch mechanisms, automatic means for first causing engagement of the said first friction clutch mechanism under certain first establishable conditions and for thereafter causing engagement of the said second friction clutch mechanism under certain second establishable conditions, and means coacting with certain elements of both said first and said second friction clutch mechanisms such that and for optionally rendering the said second friction clutch mechanism non-engageable by the said automatic engaging means while the latter maintains its engaging effect over the said first friction clutch mechanism.

13. In combination with different speed ratio of drive related pairs of connectable driving and driven members of a motor vehicle drive change speed transmission; of a speed responsive automatic clutch mechanism responsive to the speed of one of said members comprising a plurality of successively engageable systems of frictionally-engaging clutch elements each adapted to cause an individual connection between respective of the said different speed ratio of drive related pairs of said driving and driven members; with an overrunning clutch provided in series in one of the different speed ratios of drive of the said change speed transmission such that engagement of one of the said successively engageable systems of frictionally-engaging clutch elements will complete the driving connections between the respective associate pair of said driving and driven members whereby said overrunning clutch will contribute and render the respective connection one-way drive only; means for optionally actuating the said speed responsive automatic clutch mechanism into certain non-automatic means engageable states; and means including an auxiliary system of frictionally-engaging clutch elements inter-control connected with the said speed responsive automatic clutch mechanism of different individual clutch systems of frictionally-engaging elements whereby said optional action of the said automatic clutch mechanism, if sufficient, will cause the engagement of said auxiliary system of frictionally-engaging clutch elements, said auxiliary system of frictionally-engaging clutch elements forming means for causing a certain connection between a respective certain pair of the said driving and driven members.

EVERETT R. BURTNETT.